No. 668,407. Patented Feb. 19, 1901.
D. F. HUNT.
KNIFE HEAD FOR PARING MACHINES.
(Application filed Feb. 12, 1900.)
(No Model.)
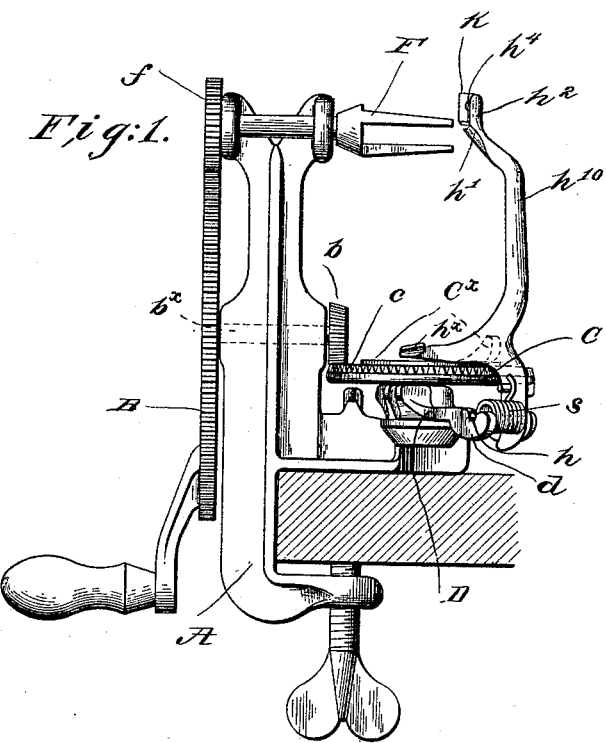
Fig. 1.
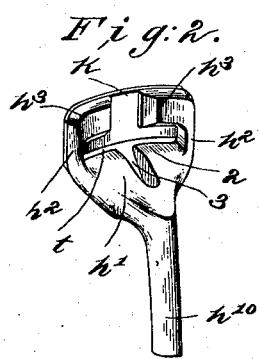
Fig. 2.
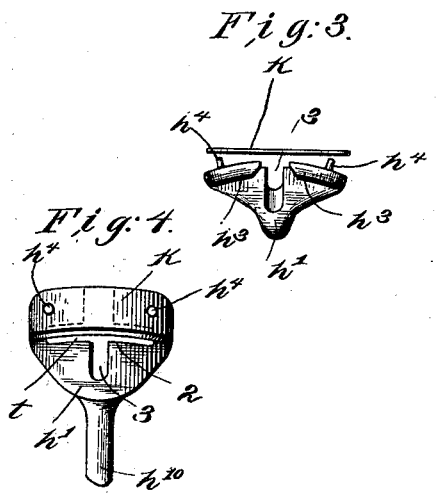
Fig. 3.
Fig. 4.
Witnesses
W. C. Lunsford
Edward H. Allen.
Inventor.
David F. Hunt,
by Crosby Gregory
Attys.

UNITED STATES PATENT OFFICE.

DAVID F. HUNT, OF ANTRIM, NEW HAMPSHIRE.

KNIFE-HEAD FOR PARING-MACHINES.

SPECIFICATION forming part of Letters Patent No. 668,407, dated February 19, 1901.

Application filed February 12, 1900. Serial No. 4,895. (No model.)

*To all whom it may concern:*

Be it known that I, DAVID F. HUNT, of Antrim, county of Hillsboro, State of New Hampshire, have invented an Improvement in Knife-Heads for Paring-Machines, of which the following description, in connection with the accompanying drawings, is a specification, like characters on the drawings representing like parts.

This invention has for its object the production of a novel knife-head for paring-machines of that type wherein the fruit to be pared is supported on a rotatable fork, while a paring blade or knife, held in a suitable head, is held up against the fruit to pare the rind or skin therefrom.

By means of my invention the knife-blade is held under tension on the head and its curvature can be readily adjusted to give the desired width of throat, so that the thickness of the paring can be regulated with great nicety.

Figure 1 is a side elevation of a well-known form of apple-paring machine with my present invention embodied therein. Fig. 2 is an enlarged perspective detail of the knife head and blade. Fig. 3 is a top or plan view of the knife-head before attachment of the knife-blade, and Fig. 4 is a front elevation of the upper portion of the knife-head.

Referring to Fig. 1, the frame A, to be clamped to a table or other support, the main driving-gear B, having a bevel-gear $b$ fast on its shaft $b^\times$, the fork F, mounted in the frame and rotated by a pinion $f$, in mesh with gear B, the cam-plate C, mounted to rotate on an upright journal in the base of the frame and provided with a bevel ring-gear $c$, in mesh with the gear $b$, and the carrier D, controlled by the cam-plate C to swing first in one and then in the other direction, may be and are of usual and well-known construction. Ears $d$ on the carrier receive the pintles $h$ of an upturned head-carrying arm $h^{10}$, having at its lower end an offset $h^\times$ to be acted upon by the cam $C^\times$ on the cam-plate C, a spring $s$ pressing the arm and head toward the fruit on the fork F.

Referring more particularly to Figs. 2, 3, and 4, the head as herein shown comprises a substantially triangular base $h'$, connected at its apex to the arm $h^{10}$ and slightly offset or bent relatively thereto, provided at or near its other corners with upturned prongs $h^2$, herein shown as inturned at their upper ends to form lips $h^3$, the outer faces of the lips being preferably convexed in the direction of their length. The base is slotted at 3 between the prongs to permit their compression toward each other, the edge 2 of the base between said prongs forming one side of the throat $t$, through which the paring passes under the lips. Lugs $h^4$ project from the outer faces of the prongs to enter holes in the knife $k$ and retain the latter in place.

The knife-head is preferably made of malleable iron to secure the necessary resiliency, and the knife $k$ is provided with holes to receive the lugs $h^4$, which latter are headed down after the knife is in place, the normal distance between the lugs being somewhat greater than the distance between the holes in the knife, so that the branches or prongs $h^2$ must be strained toward each other when applying the knife, the latter being thereafter held under tension by the tendency of the prongs to separate. After the knife is thus secured the prongs $h^2$ are slightly twisted until the lips $h^3$ thereof press upon the back of the knife hard enough to give the desired width of the throat $t$ to regulate the thickness of the paring to be removed. The slotted base increases the resiliency of the head when the prongs are compressed, as described, and the slot 3 also forms an aperture for the stems and other blemishes to pass through without clogging the knife.

The knife is made straight, of very thin steel, thus making a clean and easy cut, and after it is mounted, as described, it bears hard on the convex lips $h^3$.

A very much thinner steel can be used in accordance with my invention, making the apparatus much easier to operate, and the mode of adjusting the thickness of the parings is facilitated, the adjustment being effected by twisting the prongs $h^2$, throwing the cutting edge of the knife in or out.

My invention is not restricted to the precise construction shown and described, as I have shown only one embodiment of my invention, which may be modified without departing from the spirit and scope of my invention.

Having fully described my invention, what I claim, and desire to secure by Letters Patent, is—

1. A knife-head for paring-machines, having resilient knife-supporting prongs provided with inturned lips to rest against the back of the knife, and a knife secured to and held under tension by the prongs.

2. A knife-head for paring-machines, having a slotted base and resilient knife-supporting prongs, and a knife secured to and held under tension by the prongs, the edge of the base between said prongs forming with the knife-edge a throat for the passage of the paring.

3. A knife-head for paring-machines, having resilient knife-supporting prongs provided with inturned lips convexed on their outer faces, to rest against the back of and determine the curvature of the knife, and a knife held under tension by the prongs.

4. A knife-head for paring-machines, comprising a centrally-slotted base having upturned prongs, one at each side of the slot, provided with inturned lips, lugs on the prongs, and a knife mounted on the lugs and held under tension by compression of the base, the lips resting against the back of and determining the curvature of the knife.

5. A knife-head for paring-machines, having a resilient bifurcated knife-supporting portion.

In testimony whereof I have signed my name to this specification in the presence of two subscribing witnesses.

DAVID F. HUNT.

Witnesses:
ALBERT A. BAKER,
E. W. BAKER.